United States Patent [19]
Hickman

[11] 3,737,174
[45] June 5, 1973

[54] FULL AXLE COMPRESSION RUBBER SPRING SUSPENSION FOR VEHICLES

[76] Inventor: Albert F. Hickman, 8009 North State Road, Eden, N.Y. 14057

[22] Filed: Apr. 13, 1971

[21] Appl. No.: 133,565

[52] U.S. Cl. ............................ 280/124 B, 267/63 R
[51] Int. Cl. ................................................ B60g 11/22
[58] Field of Search ..................... 280/124 R, 124 B; 267/57.1 A, 57.1 R, 21, 15 R, 66, 67, 63 R, 63 A, 58

[56] References Cited

UNITED STATES PATENTS

| | | | |
|---|---|---|---|
| 3,033,555 | 5/1962 | Stoll | 280/124 R X |
| 2,465,098 | 3/1949 | Inskeep | 280/124 B |
| 2,740,622 | 4/1956 | Hickman | 280/124 R X |
| 3,410,573 | 11/1968 | Hickman | 267/63 R X |
| 3,301,573 | 1/1967 | Hickman | 267/63 A X |

Primary Examiner—Albert J. Makay
Attorney—Harold I. Popp

[57] ABSTRACT

A full or through axle supported by rubber tired wheels has each end connected through a bearing to one end of a link extending lengthwise of the line of travel. The opposite end of each link is connected through another bearing to the frame and a suitable resilient spring support means is operatively interposed between the axle and frame. Each such bearing is constructed, as by inclusion of a flexible rubber bushing, to permit oscillation of its connected parts abouts its center. Drive and brake torque reactions, as well as axial movement of the axle laterally of the frame, are controlled by a torque arm projecting rigidly from the center of the axle and connected to the frame by a flexible joint or bearing which flexes to permit vertical movement of either or both axle ends relative to the frame or to the other axle end.

6 Claims, 8 Drawing Figures

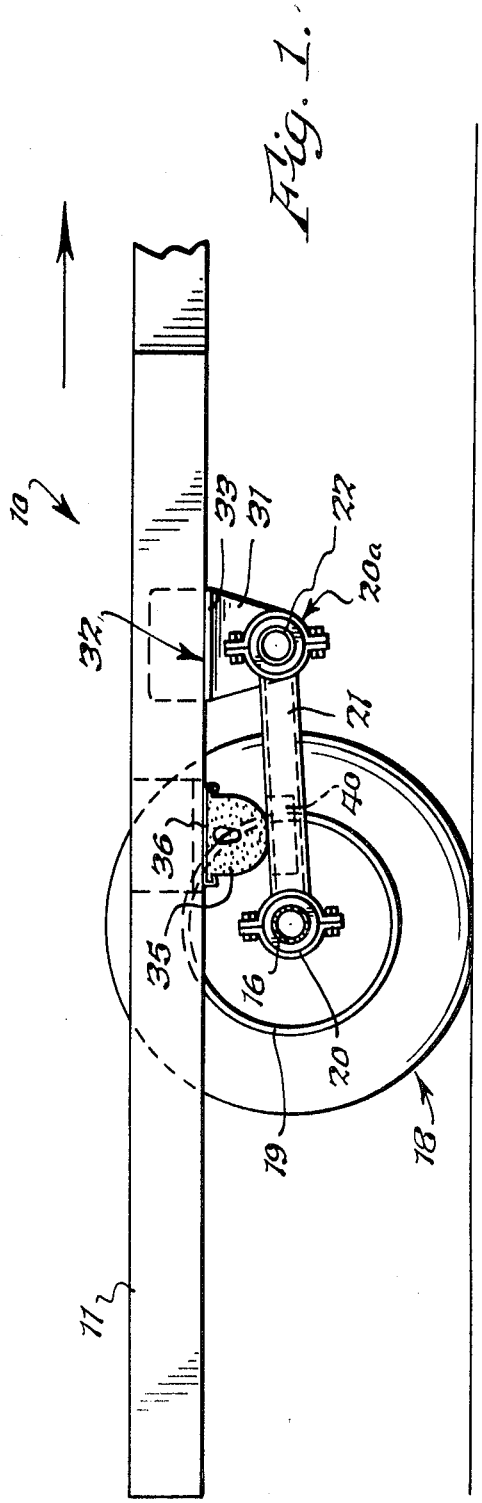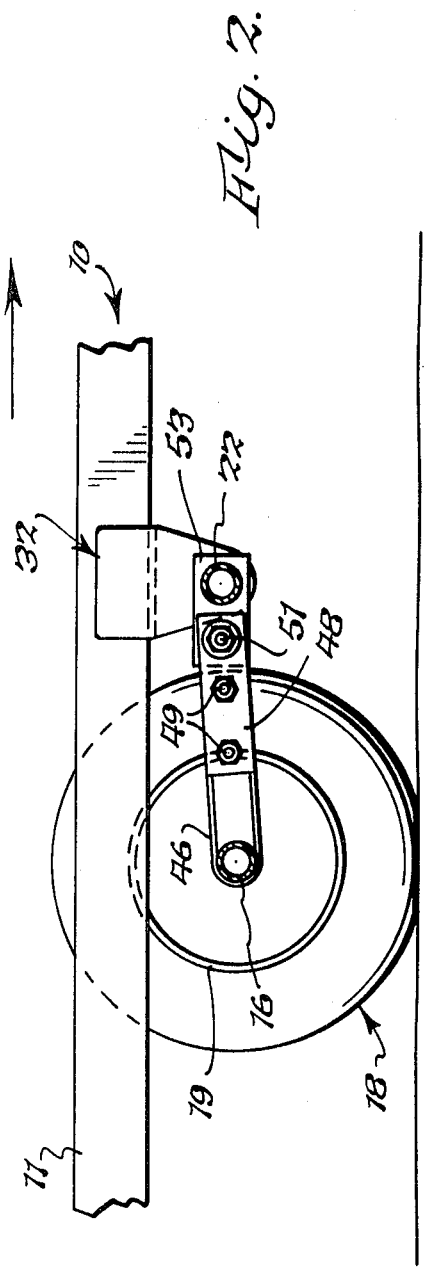

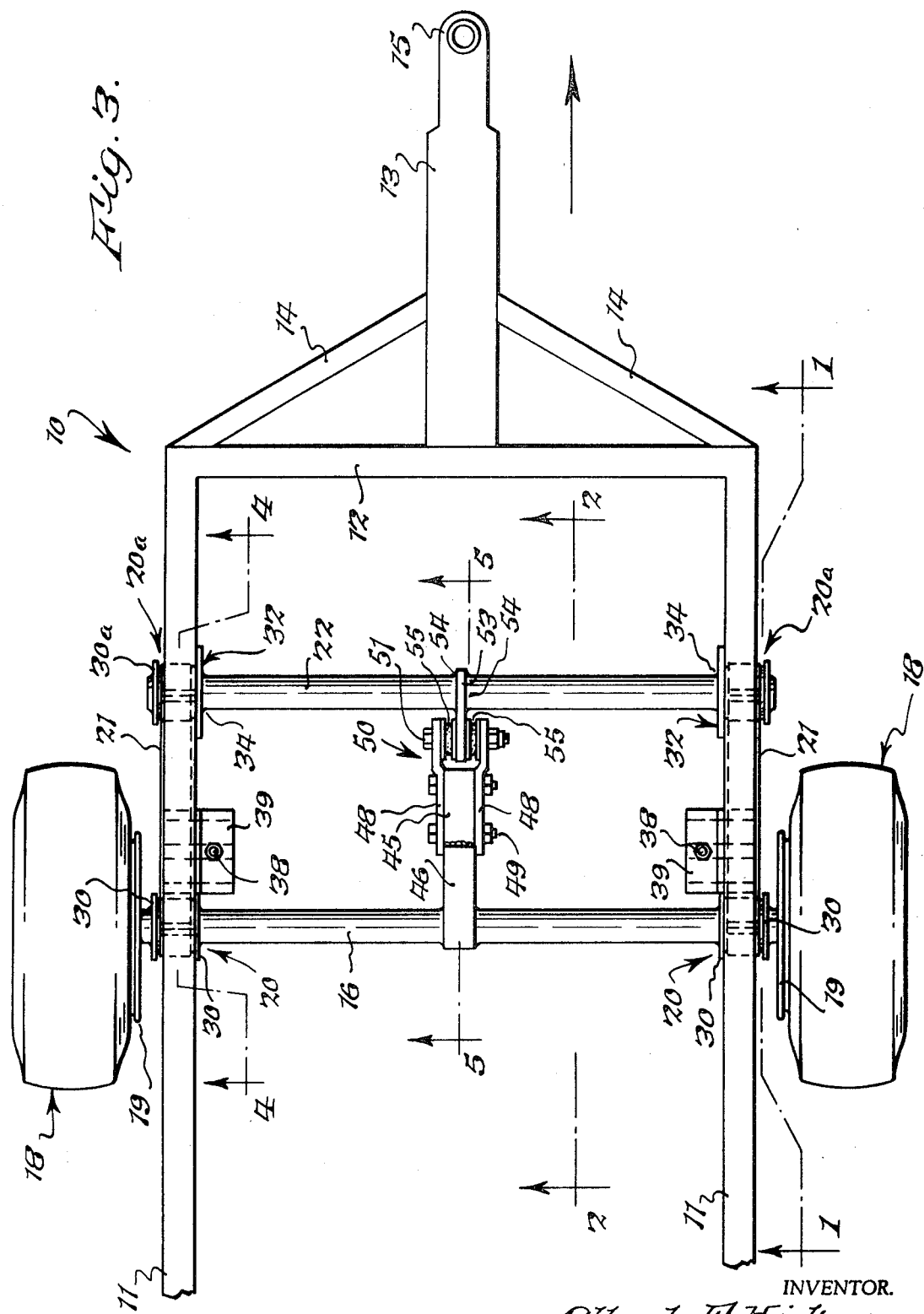

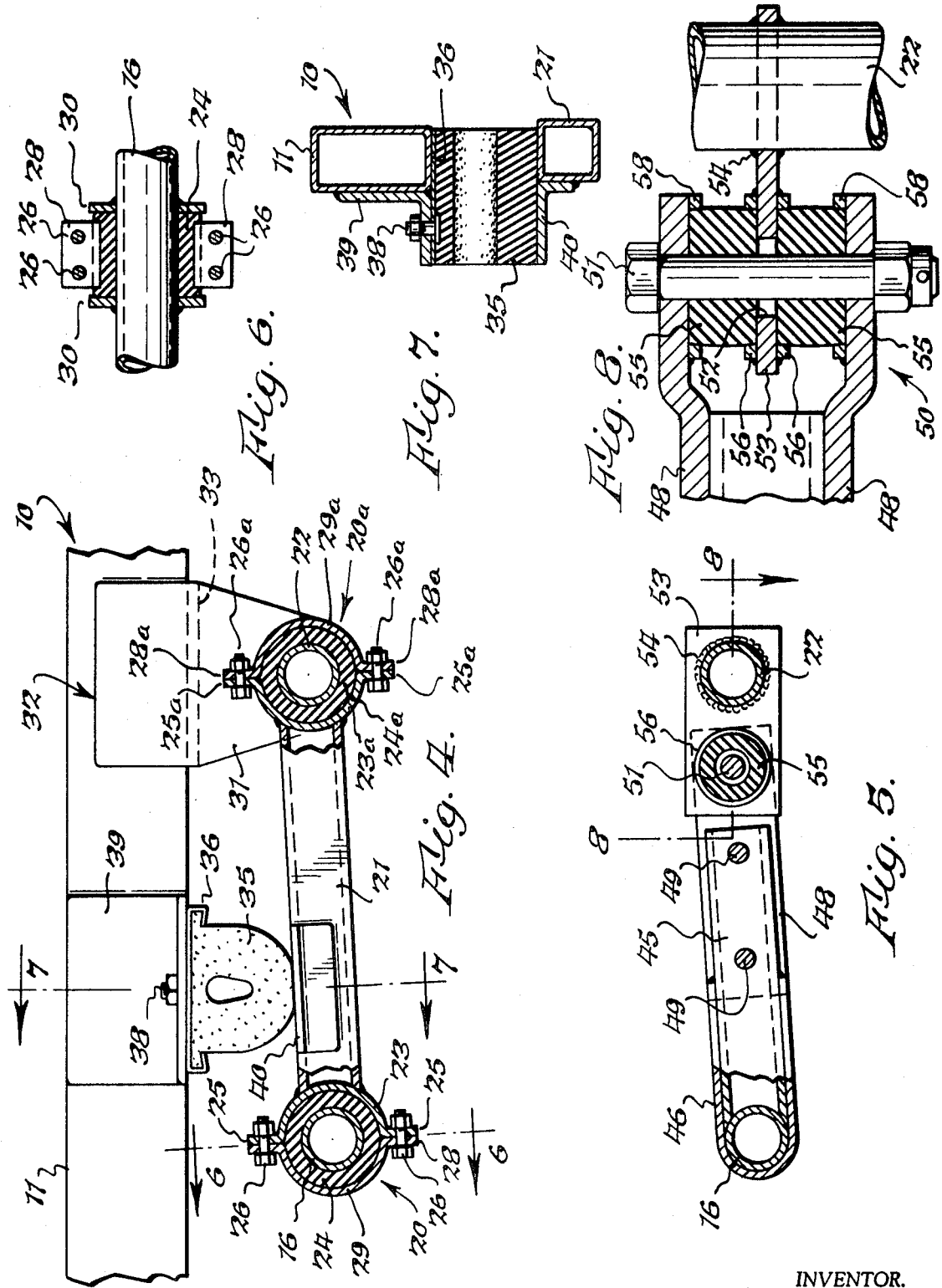

FULL AXLE COMPRESSION RUBBER SPRING SUSPENSION FOR VEHICLES

An object of the present invention is to provide a full or through axle suspension which is low in cost and at the same time provides adaquate resilient support for the frame with either wheel capable of vertical movement relative to the other wheel.

Another object is to provide a suspension which is free from friction and will not require repairs, barring accident, for the life of the vehicle.

Another object is to provide a simple and inexpensive suspension in which axial axle movement laterally of the frame is adequately controlled by a simple means which also resists drive and brake torque reactions.

Other objects and advantages will be apparent from the following description and drawings in which:

FIG. 1 is a fragmentary side elevational view of a vehicle frame supported at each side by a spring suspension embodying the present invention, this view being taken generally on line 1 — 1, FIG. 3, for clarity;

FIG. 2 is a fragmentary vertical longitudinal section taken generally on line 2 — 2, FIG. 3.

FIG. 3 is a fragmentary top plan view of the vehicle frame supported by the subject spring suspension;

FIGS. 4 and 5 are enlarged fragmentary vertical longitudinal sections taken generally on the correspondingly numbered lines on FIG. 3;

FIGS. 6 and 7 are fragmentary vertical transverse sections taken generally on the correspondingly numbered lines on FIG. 4;

FIG. 8 is a further enlarged fragmentary horizontal section taken generally on line 8 — 8, FIG. 5.

The frame can be of any suitable construction and is shown as a trailer frame 10 comprising a pair of main longitudinal horizontal side beams 11 which can be connected by front and rear cross bars 12 and as having a tongue 13 projecting forwardly from the center of the front cross bar 12 and reinforced by horizontal diagonal frame bars 14. Any suitable means 15 can be provided at the front end of the tongue for attaching to the rear of the towing vehicle (not shown).

The entire vehicle chassis, together with the present spring suspension, is constructed substantially symmetrically about a vertical longitudinal medial plane, and hence it is deemed sufficient to confine the following description to the one (left) side of the vehicle, it being understood that this description and the same reference numerals apply to the opposite (right) side of the vehicle.

The vehicle frame is supported by a single continuous axle beam 16 extending across and under the frame 10 and the opposite ends of which project outwardly from the opposite sides of the frame. This full or through axle is preferably made of a cylindrical tube for a purpose which will presently appear and each end thereof so projecting from the side of the vehicle frame 10 is rotatably supported by a rubber tired road engaging wheel 18. These wheels are shown as being braked by a brake mechanism (not shown) within a conventional brake drum 19 associated with each wheel.

Each axle end is connected by an axle bearing 20 to the rear end of an arm 21 which can be of any suitable form but is shown as being in the form of a tube which is square or rectangular in cross section and arranged under the corresponding main longitudinal side frame beam 11. The opposite or forward end of each arm 21 is connected by an identical bearing 20a to the corresponding end of a cross shaft 22 which is of cylindrical tubular form in cross section, the external diameters of the axle 16 and cross shaft 22 through their bearings 20, 20a preferably being the same.

These axle and frame bearings 20, 20a each comprises a semicylindrical half bearing metal shell 23, 23a embracing a flexible rubber bushing 24, 24a, in turn embracing the corresponding end of the tubular axle 16 and tubular cross shaft 22, respectively.

Each metal half bearing shell 23, 23a has radially projecting end flanges 25, 25a secured by bolts 26, 26a to similar flanges 28, 28a of a companion metal half bearing shell 29, 29a. The bolts 26 are tightened to draw the metal half bearing shells 23, 29 together and force the rubber bushings 24 into compressive relation with the ends of the tubular axle 16, the endwise displacement of the rubber bushings 24 being limited by a pair of spaced abutment rings 30 welded to project radially from the tubular axle 16 on opposite sides of and in spaced relation to the half bearing shells 23, 29, as best shown in FIG. 6. Similarly the bolts 26a are tightened to draw the half bearing shells 23a, 29a together and force the rubber bushings 24a into compressive relation with the ends of the tubular cross shaft 22, the endwise displacement of the rubber bushings 24a being limited by an abutment ring 30a welded to project radially from each extremity of the cross shaft and the outer face part of the vertical part 31 of a metal frame bracket 32, this vertical part being fitted against the inner face of the corresponding main longitudinal side frame beam 11 and having a horizontal flange 33 fitting thereunder as best shown in FIG. 1. Each frame bracket 32 can be secured to its main longitudinal side frame beam 11 in any suitable manner and the corresponding end of the cross shaft 22 extends through the vertical part 31 of each frame bracket and is welded thereto as illustrated at 34, FIG. 3, so that the cross shaft 22 and frame brackets 32 are rigidly fixed to the frame.

The vehicle frame is resiliently supported on the axle 16 and wheels 18 by a compressible resilient rubber block or body 35 interposed between each arm 21 and the companion main longitudinal side frame beam 11. Each such rubber block or body is preferably constructed as described in detail in my U.S. Pat. No. 3,539,198, dated Nov. 11, 1970, that is, it has a flat face on one side, its upper side, fixed to a mounting plate 36, which is in turn fixed, as by one or more bolts 38, to the underside of a corresponding main longitudinal side frame beam 11 and to an L-shaped frame bracket 39 mounted on the latter to provide adaquate back-up face area for the mounting plate 36. The other or bottom side of the rubber body is of semicylindrical form and has full time non-adhering touching contact with the top face of a companion arm 21 as well as an L-shaped arm bracket 40 mounted on the latter to provide adequate face area for the uniform distortion of the rubber block or body 35 in being compressed to provide the resilient resistance for supporting the adaquate frame 10 on the rubber tired wheels 18.

While the resilient support for the frame 10 is substantially entirely provided by the rubber bodies 35, the rubber bushings 24, 24a of the four bearings 20, 20a must be thick enough to not only permit vertical movement of the rear ends of the arms 21 but also to permit one of these arms to rise while the other falls, as in traveling over a road having a bump engaged by one wheel 18 and a depression encountered by the other wheel. Bearings with rubber bushings of such thickness also permit a parallelogram movement of the axle 16, arms 21 and cross shaft 22, that is, a movement of the axle 16 transversely of the line of travel of the vehicle. On the other hand, these rubber bushed bearings 20, 20a permit only a very slight movement of the movable suspension parts, that is, the wheels 18, axle 16, arms 21, rubber blocks 35 and cross arm 22 lengthwise of the line of travel of the vehicle. It will be apparent that such response could also be obtained by ordinary ball-and-socket bearings for the rubber bushed bearings 20,20a With such operating conditions, however, it is necessary to further restrain the permissible movement of the axle 16 laterally of the line of travel and it is also necessary to provide further restraint against drive and brake torque reactions as with sudden application of the brake mechanisms represented by the brake drums 19. Such restraints are provided by a mechanism which is preferably constructed as follows:

The numeral 45 represents a control arm which is preferably of rectangular tubular form in cross section with vertical sides and with its rear end curved to fit the forward side of the axle 16 as best shown in FIG. 5. A C-shaped strap 46 has its rear curved part embracing and welded to the axle 16 and its ends fitting flat against and welded to the top and bottom sides of the control arm 45. The control arm 45 projects from the axle 16 toward the cross rod 22 and has side plates 48 secured by bolts 49 to the sides of the forward end of the control arm 45 to provide a vertical sided fork 50 projecting forwardly therefrom. A horizontal bolt 51 extends through the sides of this fork and also through an enlarged opening 52 in a vertical plate 53, the forward end of which embraces and is welded, as indicated at 54, to the center of the cross tube 22, as best shown in FIG. 8. Cylindrical resilient rubber cushions, bodies or blocks 55 embrace opposite ends of the bolt 51 and are interposed between the plate 53 and the inner face of the corresponding fork plate 48. To retain these cushion blocks in position, each is embraced at its inner end by a metal ring 56 welded to the corresponding side of the vertical plate 53 and at its outer end by a metal ring 58 welded to the inner face of the corresponding fork plate 48.

OPERATION

Assuming, in travel, one wheel encounters a bump in the road and rises relative to the vehicle frame 10. Such movement is permitted by its arm or link 21 flexing the rubber bushing 24 in which the corresponding end of the axle 16 is journalled and also flexing the rubber bushing 24a in which the corresponding frame pivot pin formed by the cross shaft end is journalled. This cross shaft 22 is rigidly secured to and hence is in effect an integral part of the vehicle frame 10. With such movement of one wheel 18, one end of the through axle 16 rises relative to its other end, this being permitted by the flexing of the four rubber bushings 24, 24a of the bearings 20, 20a. With rubber bushings 24, 24a thick enough to so flex and permit such vertical wheel movement relative to the frame and relative to each other, they would also permit a parallelogram movement of the axle 16, arms or links 21 and cross shaft 22, this resulting in excessive axial movement of the axle 16 laterally of the line of vehicle travel.

Such excessive lateral movement of the axle 16 is prevented by the rigid arm 45 fixed to the center of the axle 16 and which transmits such lateral movement to the corresponding rubber cushion 55 and compresses it against the plate 53 which is, in effect, a frame plate, being connected to the cross tube 22. The resilient resistance of such rubber cushion 55 is, of course, sufficient to prevent such excessive lateral axle movement and parallelogram action of the axle 16, arms 21 and cross rod 22.

The rigid control arm 45 also yieldingly restrains drive and brake torque reactions. Thus assuming the brake drums 19 to be activated going forwardly, the resulting downward movement of the forward end of the control arm 45 is resisted by the two rubber cushions 55 to absorb such braking torque, such action being permitted by the oversize hole 52, FIG. 8, of the frame plate 53 and through which the control arm bolt 51 extends. These resilient rubber cushions 55 do not, however, interfere with the upward movement of one end of the axle 16 relative to its opposite end since such axle movement is merely translated by the rigid arm 45 into a corrosponding movement of the bolt 51, FIG. 8. Also these rubber cushions 55 permit a slight fore-and aft movement of the controlarm 45 along the line of vehicle travel, such being required since the effective length of the control arm 45 is shorter than the effective length of the arms 21 as will be seen from an inspection of FIG. 3.

In the following claims "wheel" is intended to include the ground engaging means 18 supporting the through axle 16 whether in the form of the single wheel shown or in the form of a dual tired wheel, and also the term "rubber" is intended to include natural or synthetic rubber or mixtures thereof.

I claim:

1. A vehicle spring suspension adapted to be interposed between a vehicle frame and a single continuous rigid axle beam extending across, and the opposite ends of which project outwardly from opposite sides of, said frame, and are supported by rubber tired wheels; wherein the improvement comprises a link interposed between each of said axle ends and said frame and extending generally lengthwise of the line of vehicle travel, relatively thick flexible rubber bushings providing first bearing means severally connecting said axle ends and the adjacent ends of said links, relatively thick flexible rubber bushings providing second bearing means severally connecting the other ends of said links to said frame on a common axis extending transversely of said line of vehicle travel, resilient spring means separate from said axle beam operatively interposed between said axle beam and frame and resiliently supporting said frame on said axle beam, said rubber bushings inhibiting movement of said axle beam and links lengthwise of said line of vehicle travel but being each of such form as to permit a parallelogram-like movement of said rigid axle beam, links and axis, and means restricting said last mentioned parallelogram-like movement without preventing independent vertical movement of each said axle end relative to said frame and ground, comprising an arm rigidly fixed at one end to the center portion of said axle beam, and means flexibly connecting the other end of said arm to said frame to restrict axial movement of the axle beam laterally of said line of vehicle travel.

2. A vehicle spring suspension as set forth in claim 1 wherein said spring means are interposed between said links and said frame.

3. A vehicle spring suspension as set forth in claim 2 wherein said spring means are resilient rubber bodies each acted upon in compression by said links and frame.

4. A vehicle spring suspension as set forth in claim 1 wherein said arm projects toward said common axis and said means flexibly connecting said arm to said frame is arranged adjacent said axis.

5. A vehicle spring suspension adapted to be interposed between a vehicle frame and a single continuous axle beam extending across, and the opposite ends of which project outwardly from opposite sides of, said frame, and are supported by rubber tired wheels; wherein the improvement comprises a link interposed between each of said axle ends and said frame and extending generally lengthwise of the line of vehicle travel, first bearing means severally connecting the adjacent ends of said links to the companion axle ends, second bearing means severally connecting the other ends of said links to said frame on a common axis extending transversely of said line of vehicle travel, resilient spring means operatively interposed between said axle beam and frame and resiliently supporting said frame on said axle beam, each of said bearing means permitting oscillation of the parts connected thereby about the center thereof in all directions with said first bearing means inhibiting movement of said axle beam lengthwise of said links and with said second bearing means inhibiting movement of the companion ends of said links lengthwise of said line of vehicle travel whereby said first and second bearing means permit vertical movement of each axle end relative to the vehicle frame and relative to the opposite axle end and would also permit axial movement of the axle beam laterally of said line of vehicle travel, and means restricting said last mentioned axial movement of the axle beam without preventing such vertical movement of each axle end relative to said frame and relative to the opposite axle end, comprising an arm rigidly fixed at one end to the center portion of said axle beam and means flexibly connecting the other end of said arm to said frame to resist brake and drive torque reactions from said wheels, comprising a metal member connected to said frame, a pair of rubber cushions on opposite sides of said metal member and arranged on an axis parallel with said common axis and a yoke at said other end of said arm having its jaws engaging said rubber cushions adjacent said common axis, said arm and flexibly connecting means restricting such axial movement of the axle beam laterally of said line of travel.

6. A spring suspension as set forth in claim 5 wherein said means flexibly connecting said arm to said frame additionally includes a rod member carried by the jaws of said yoke and extending through said cushion members and also through an oversize hole in said metal member.

* * * * *